United States Patent [19]

Wayne

[11] Patent Number: 5,044,682
[45] Date of Patent: Sep. 3, 1991

[54] PICKUP TRUCK BED LINER DIVIDER INSERT

[76] Inventor: Mark Wayne, 29436 Briarbank Ct., Southfield, Mich. 48034

[21] Appl. No.: 617,496

[22] Filed: Nov. 23, 1990

[51] Int. Cl.⁵ ............................................. B62D 33/00
[52] U.S. Cl. ..................................... 296/39.2; 410/129
[58] Field of Search ........................... 296/39.1, 39.2; 410/129, 140, 141, 143, 144, 151, 152; 220/532, 533

[56] References Cited

U.S. PATENT DOCUMENTS

| | | | |
|---|---|---|---|
| D. 271,009 | 10/1983 | Fishler. | |
| 2,697,631 | 12/1954 | Miller | 410/140 |
| 4,215,898 | 8/1980 | Ulics | 296/183 |
| 4,436,215 | 3/1984 | Kleinert et al. | 220/22.3 |
| 4,491,362 | 1/1985 | Kennedy | 296/183 |
| 4,750,776 | 6/1988 | Barben | 296/39.2 |
| 4,767,149 | 8/1988 | Rye | 296/39.2 |
| 4,768,822 | 9/1988 | Gower | 296/39.2 |
| 4,887,947 | 12/1989 | Bott | 410/129 X |
| 4,958,876 | 9/1990 | Diaco et al. | 410/144 X |

Primary Examiner—Margaret A. Focarino
Assistant Examiner—Joseph D. Pape
Attorney, Agent, or Firm—Gifford, Groh, Sprinkle, Patmore and Anderson

[57] ABSTRACT

A bed liner divider system for interfitting with tapered, V-shaped slots defined in the bed liner of a pick-up truck and the like comprises one or more removable divider portions and at least one removable insert slottingly fittable within at least one of the tapered slots. The insert includes a tapered base portion for interattachment with the slot and a channel portion for removably receiving the divider portion. The insert has a wider upper part relative to a narrower lower part. The insert may be permanently fastened to the bed liner. The insert may be of one-pieced construction.

20 Claims, 1 Drawing Sheet

U.S. Patent
Sep. 3, 1991
5,044,682
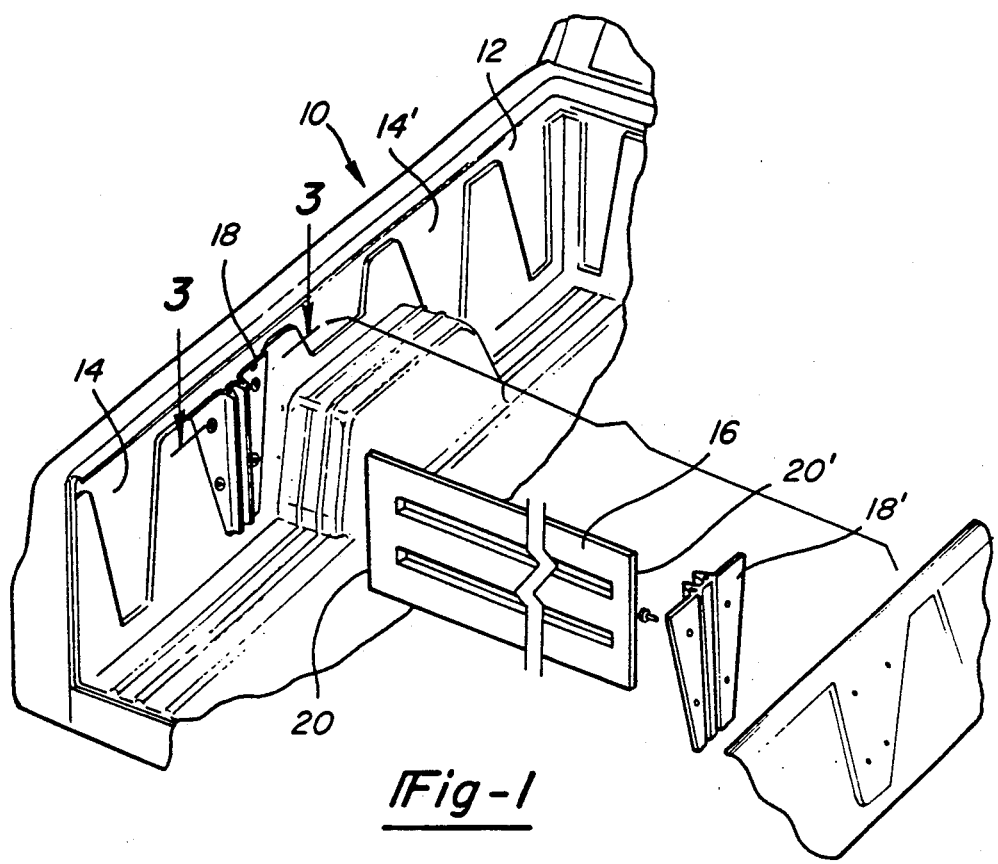
*Fig-1*
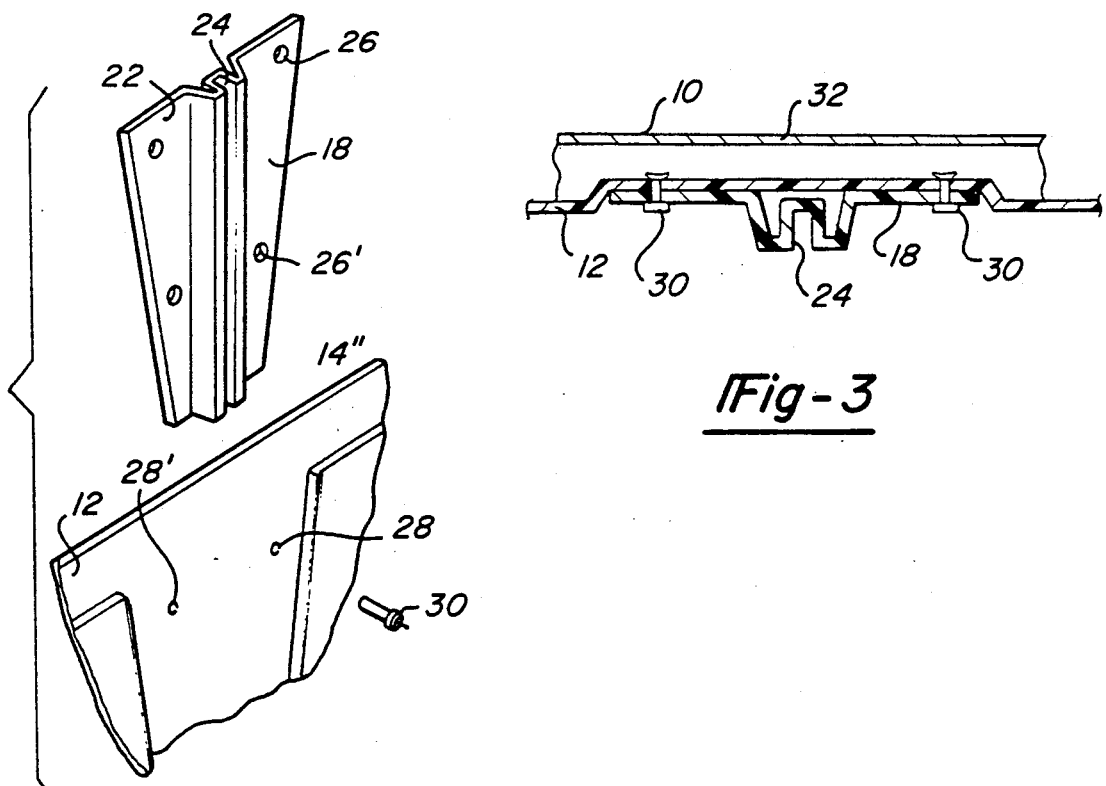
*Fig-2*
*Fig-3*

PICKUP TRUCK BED LINER DIVIDER INSERT

BACKGROUND OF THE INVENTION

I. Field of the Invention

The present invention relates generally to bed liner divider systems for interfitting with the bed liner of a pickup truck and the like. More particularly, the present invention relates to a bed liner divider system for interfitting with tapered slots defined in the bed liner of a pickup truck where the system includes one or more removable divider portions in at least one removable tapered insert slottingly fittable within the tapered slots.

II. Description of the Relevant Art

The increasing popularity of the pickup truck can easily be noted by anyone who travels on highways. Automobile companies have noted dramatic growth in the market for pickup trucks and similar vehicles. This is probably due to the fact that these types of vehicles offer extremely practical transportation while concurrently being useable for work and the like. Many auto vehicle owners now have pickup trucks as "second cars" to fill the need for being able to move materials and goods practically and comfortably when necessary.

Very shortly after the explosive growth of the sale of pickup trucks has noted, owners sought ways of protecting their investment. Such ways include seat covers, paint coatings, protective molding and the like. However, probably the most important protective device available for the pickup truck owner is the now very popular bed liner. The pickup truck bed liner is composed of a polymerized material, such as a very hard plastic, and may be easily slipped into the ted of a pickup truck for protection of the bed from scratches and from the elements.

With the pickup truck and bed liner combination, many owners sought to maximize the utility of their pickup truck. Particularly, owners sought to keep, for example, tools in the bed of the pickup truck. To keep tools in the bed of the pickup truck without their rolling and shifting about required the purchase and installation of a pickup truck bed box. However, the bed box has relatively limited utility in that its primary function is directed at the keeping and storage of tools and the like. It is not, for example, directed at use such as may be found for keeping larger and more cumbersome items.

Accordingly, other methods of maximizing the utilization of the pickup truck bed were souqht. One such answer was to include in the pickup truck bed a series of dividers whereby the pickup truck owner could divide the bed into two or more sections, each section being useable for the carriage of different items.

However, while simple in principle, such dividers are not so easily fitted into the pickup truck bed liner. This is particularly true when the pickup truck bed liner does not provide for slots and the like.

There is a particularly type of very popular liner on the market which includes along its walls a plurality of V-shaped, tapered and depressed inserts. These inserts make installation of a divider wall very impractical because the wall itself is no longer flush because of their presence.

Accordingly, although the bed liner itself has many practical applications, its utility is limited by the impracticality of fitting a divider system into the bed liner, particularly when the bed liner is of the type that has tapered depressed inserts defined in its walls. Prior approaches at overcoming the known problems of maximizing the utility of pickup truck beds have failed.

SUMMARY OF THE PRESENT INVENTION

The present invention provides a bed liner divider system for interfitting with the tapered slots defined in the bed liner of a pickup truck and the like.

The divider system comprises one or more removable divider wall portions having substantially squared ends and at least one removable insert slottingly fittable within at least one of the tapered slots.

The removable wall divider portion is preferably composed of a polymerized material, and may have shelves thereon for the placement on top thereof of shelves and the like.

The inserts are also preferably composed of a polymerized material, and include a base portion and a channel portion. The base portion defines a substantially tapered, V-shaped body being wider at its top end relative to its bottom end. The insert is inserted bottom end down into the bed liner slot defined in the wall of the bed liner.

The back side of the base portion is substantially flat, to thereby accomodate the substantially flat wall of the slot of the bed liner. The thickness of the base portion is preferably that of the depth of the tapered slot defined in the bed liner.

The base portion may have defined therethrough a number of apertures through which fasteners, such as screws, nuts and bolts and the like may be inserted for attachment of the insert to the wall of the bed liner. A channel portion is fitted to the top side of the base portion. The channel portion is axially mounted along the length of the base portion. The channel is constructed whereby the divider wall may be removably inserted therein. The divider wall may be attached to the channel by fasteners as preferred.

The insert itself is preferably of one-piece construction, thereby making manufacture relatively simple.

Because of its light weight, the divider system of the present invention may be easily shipped and stored, and may be simply manufactured. Because of its general flexibility, the divider system of the present invention may be used to construct a variety of different-sized sections within the bed of the pickup truck.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which:

FIG. 1 is a partial perspective view illustrating the elements of the invention showing an insert in place and the relative position of an unfixed divider;

FIG. 2 is an exploded view illustrating the insert of the present invention in place above the slot to which it is to be attached; and FIG. 3 is a view taken along line 3—3 of FIG. 1 illustrating the insert and its associated liner wall in cross section.

DETAILED DESCRIPTION OF THE PREFERRED EMBODIMENT OF THE PRESENT INVENTION

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, the elements of the present bed liner divider system are illustrated substantially in place relative to the interior segments of a pickup truck bed and its associated liner. The pickup truck bed is generally indicated as 10, although it must be understood that this invention may be fittable in the bed portions of vans and the like.

Within the pickup bed 10 is situated a bed liner 12. The bed liner 12 is of a type having spaced apart V-shaped slots 14, 14'. These slots are provided in the liner 12 so as to improve the overall integrity of the liner construction.

The primary elements of the divider system according to the present invention comprise a divider wall 16 and an insert 18. As illustrated, the divider wall is a substantially rectangular wall having a first end 20 and a second end 20'. Preferably, the divider wall 16 is composed of a light weight polymerized material.

The insert 18 is illustrated in one aspect as being slottingly fitted within a V-shaped slot of the liner 12. An additional insert 18' is illustrated as being positioned as it would be inserted in a slot.

As illustrated, the divider wall 16 is fittable and interattachable with both the inserts 18, 18'. Of course, the insert 18 is illustrated in its present slotted position only for purposes of discussion, and may be situated in other slots of the liner 12 as may be preferred. Of course, minor variations in the shape of the slots 14, 14' may be made without removing the present invention from the discussed scope.

Referring to FIG. 2, an insert 18 is illustrated as it would be fitted into a slot 14''. From this view it can be seen that the liner 18 is preferably composed of a one-pieced construction, and this may be most efficiently prepared in a molding or stamped process.

The insert 18 is comprised of a base portion 22 and a channel portion 24. The base portion 22 is substantially flat, whereas the channeled portion 24 is axially defined along the front side of the insert 18. As illustrated, the insert 18 has defined therethrough a number of fastening apertures 26, 26'. These apertures, when situated over a coaxial set of apertures 28, 28', may be used for fastening the insert 18 to the liner 12 by attachment with one or more of fasteners 30.

Of course, the fasteners 30 are themselves optional, as the divider wall 16 is designed to press against the channel 24, thereby keeping the insert 18 in place against the liner 12. However, for added security, the fasteners 30 may be employed.

Referring to FIG. 3, a cross sectional view of an insert 18 is illustrated in place against the liner 12. An inner wall 32 of the pickup bed 10 is also shown. According to this view, the inserted construction of the insert 18 into the slot defined in the liner 12 may be more fully understood and the channel construction 24 may also thereby be more fully understood.

Of course, the tapered, V-shape of the insert 18 according to the present illustration is only suggested, as it is well understood that the taper of the insert 18 may be of more less severe degree as may be required according to the situation and construction of the liner 12.

Having described my invention, however, many modifications thereto will become apparent to those skilled in the art to which it pertains without deviation from the spirit of the invention as defined by the scope of the appended claims.

I claim:

1. A bed liner divider system for interfitting with tapered slots defined in the bed liner of a pick-up truck and the like, said system comprising:
    a removable divider portion;
    at least one insert slottingly fittable within at least one of said slots;
    said at least one insert having a base portion and a divider receiving portion;
    said base portion having at least two opposing sides:
    said two opposing sides defining a taper;
    said divider receiving portion comprising a channel.

2. The bed liner system of claim 1 wherein said base portion has a front side and a back side, said back side being substantially planar.

3. The bed liner system of claim 2 wherein said insert has a longitudinal axis;
    said channel being axially fitted to said front side of said base portion.

4. The bed liner system of claim 3 wherein said insert is of one-pieced construction.

5. The bed liner system of claim 4 wherein said insert is composed of a polymerized material.

6. The bed liner system of claim 5 wherein said insert is fastenable to said liner.

7. The bed liner system of claim 6 wherein said base portion has at least one fastener-receiving aperture defined therein.

8. The bed liner system of claim 7 wherein said base portion has a top end and a bottom end, said top end being wider than said bottom end.

9. A bed liner divider system for interfitting with tapered slots defined in the bed liner of a pick-up truck and the like, said system comprising:
    a removable divider portion;
    at least one insert slottingly fittable within at least one of said slots;
    said at least one insert having a base portion and a divider receiving portion;
    said base portion having a front side and a back side;
    said back side being substantially planar;
    said base portion having at least two opposing sides;
    said two opposing sides defining a taper;
    said base portion having a longitudinal axis;
    said divider receiving portion comprising a channel;
    said channel being axially fitted to said front side of said base portion.

10. The bed liner system of claim 9 wherein said insert is of one-pieced construction.

11. The bed liner system of claim 10 wherein said insert is composed of a polymerized material.

12. The bed liner system of claim 11 wherein said insert is fastenable to said liner.

13. The bed liner system of claim 12 wherein said base portion has at least one fastener-receiving aperture defined therein.

14. The bed liner system of claim 13 wherein said base portion has a top end and a bottom end, the width of said top end being greater than the width of said bottom end.

15. A bed liner divider system for interfitting with the bed liner of a pick-up truck and the like, said system comprising:
- a divider portion; and
- at least one insert interfittable between said divider portion and said liner, said at least one insert being removably fittable;
- said insert having a base portion;
- said base portion being slottingly attachable to selected insert-receiving slots of said liner;
- said base portion being tapered for cooperatively fitting with said slots of said liner.

16. The bed liner system of claim 15 wherein said insert further comprises a divider receiving portion, said divider receiving portion comprising a channel.

17. The bed liner system of claim 16 wherein said divider portion is removably insertable within said channel.

18. The bed liner system of claim 17 wherein said base portion has a front side and a back side, said back side being substantially planar.

19. The bed liner system of claim 18 wherein said insert is fastenable to said liner.

20. The bed liner system of claim 19 wherein base portion has at least one fastener-receiving aperture defined therein.

* * * * *